United States Patent
Sui et al.

(10) Patent No.: US 12,418,514 B2
(45) Date of Patent: Sep. 16, 2025

(54) COMPUTER-BASED PRIVACY PROTECTION FOR CHAT GROUPS IN A VIRTUAL ENVIRONMENT

(71) Applicant: International Business Machines Corporation, Armonk, NY (US)

(72) Inventors: Guang Han Sui, Beijing (CN); Peng Hui Jiang, Beijing (CN); Su Liu, Austin, TX (US); Yu Zhu, Beijing (CN); Jun Su, Beijing (CN); Jun Feng Duan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 18/486,570

(22) Filed: Oct. 13, 2023

(65) Prior Publication Data

US 2025/0126101 A1 Apr. 17, 2025

(51) Int. Cl.
*H04L 9/40* (2022.01)
*G10L 21/003* (2013.01)
(Continued)

(52) U.S. Cl.
CPC ............ *H04L 63/04* (2013.01); *G10L 21/003* (2013.01); *G10L 25/90* (2013.01); *G16Y 10/75* (2020.01); *G16Y 20/40* (2020.01)

(58) Field of Classification Search
CPC ........ H04L 63/04; G16Y 20/40; G16Y 10/75; G10L 21/003; G10L 25/90
(Continued)

(56) References Cited

U.S. PATENT DOCUMENTS

| 8,942,671 B2 * | 1/2015 | Haynes | H04M 3/205 |
| | | | 455/410 |
| 10,270,592 B1 * | 4/2019 | Ghetti | H04L 63/0428 |

(Continued)

FOREIGN PATENT DOCUMENTS

| CN | 102957595 A | 3/2013 |
| CN | 112131377 A | 12/2020 |

(Continued)

OTHER PUBLICATIONS

Cudeiro et al., "Capture, Learning, and Synthesis of 3D Speaking Styles," In Proceedings IEEE Conf. on Computer Vision and Pattern Recognition (CVPR), pp. 10101-10111, Jun. 2019, https://ps.is.mpg.de/uploads_file/attachment/attachment/510/paper_final.pdf.

(Continued)

*Primary Examiner* — Tauqir Hussain
(74) *Attorney, Agent, or Firm* — Joseph P. Curcuru (57) ABSTRACT

In an approach to improve the privacy of chat groups within a virtual world, in response to identifying a private chat group has been created between two or more users, embodiments collect, by an internet of things (IoT) sensor set, a voice for each user in the private chat group. Further, embodiments analyze, by an analysis module, the collected voice, an intonation associated with the collected voice and an original pronunciation associated with the collected voice, and generate a de-content pronunciation based on the analysis of the collected voice, the intonation, and the original pronunciation. Additionally, embodiments output, by the IoT sensor set, the intonation and the original pronunciation to the two or more users in the private chat group and output, by the IoT sensor set and a client computer, the intonation and the de-content pronunciation to one or more users outside the private chat group.

20 Claims, 6 Drawing Sheets

(51) Int. Cl.
  *G10L 25/90* (2013.01)
  *G16Y 10/75* (2020.01)
  *G16Y 20/40* (2020.01)
(58) Field of Classification Search
  USPC .......................................................... 726/27
  See application file for complete search history.

(56) References Cited

U.S. PATENT DOCUMENTS

| | | | |
|---|---|---|---|
| 10,817,066 B2 | 10/2020 | Ross | |
| 10,964,312 B2 | 3/2021 | Barton | |
| 11,057,230 B2 | 7/2021 | Brunn | |
| 11,176,472 B2 | 11/2021 | Francis | |
| 11,537,740 B2* | 12/2022 | Srinivas | H04L 9/0825 |
| 11,547,942 B1 | 1/2023 | Thvar | |
| 11,627,006 B1* | 4/2023 | Chew | H04L 51/02 |
| | | | 704/275 |
| 11,790,893 B2* | 10/2023 | Lee | H04W 72/23 |
| | | | 704/232 |
| 11,989,636 B1* | 5/2024 | Leeds | G06N 3/006 |
| 12,166,754 B2* | 12/2024 | Cinaqui Pereira | G06F 21/64 |
| 12,364,172 B2* | 7/2025 | Offrein | H10N 70/8833 |
| 2012/0157045 A1* | 6/2012 | Haynes | H04L 65/1063 |
| | | | 455/410 |
| 2016/0197862 A1 | 7/2016 | Moyers | |
| 2018/0157333 A1* | 6/2018 | Ross | G06F 3/013 |
| 2020/0034551 A1* | 1/2020 | Cantrell | H04L 9/3247 |
| 2020/0084055 A1* | 3/2020 | Brunn | H04L 12/1813 |
| 2021/0216723 A1* | 7/2021 | Zhang | G06F 18/214 |
| 2021/0256417 A1* | 8/2021 | Kneller | G10L 15/1815 |
| 2021/0299552 A1* | 9/2021 | Morita | H04R 1/406 |
| 2021/0299554 A1* | 9/2021 | Kobayashi | A63F 13/24 |
| 2021/0307188 A1* | 9/2021 | Kobayashi | H05K 5/03 |
| 2021/0311541 A1* | 10/2021 | Paz | G06F 3/167 |
| 2022/0005483 A1* | 1/2022 | Yu | G06Q 10/107 |
| 2022/0016520 A1* | 1/2022 | Morita | H04R 1/406 |
| 2022/0062774 A1* | 3/2022 | Mulase | A63F 13/795 |
| 2022/0101849 A1* | 3/2022 | Suzuki | A63F 13/424 |
| 2022/0295124 A1* | 9/2022 | Chetty | G06Q 30/0207 |
| 2022/0319520 A1* | 10/2022 | Yu | G10L 15/22 |
| 2022/0319538 A1* | 10/2022 | Yu | G10L 15/26 |
| 2022/0351716 A1* | 11/2022 | Kim | G10L 25/30 |
| 2022/0360742 A1 | 11/2022 | Krol | |
| 2023/0026945 A1 | 1/2023 | Friedlander | |
| 2023/0206570 A1 | 6/2023 | Bae | |

FOREIGN PATENT DOCUMENTS

| | | | | |
|---|---|---|---|---|
| CN | 114548120 A | 5/2022 | | |
| CN | 114627878 B | 8/2022 | | |
| CN | 114926716 A | 8/2022 | | |
| CN | 114970558 A | 8/2022 | | |
| CN | 115688151 A | 2/2023 | | |
| JP | 67315131 A | 11/2020 | | |
| WO | WO-2021013459 A1 * | 1/2021 | ......... | H04L 63/0861 |

OTHER PUBLICATIONS

Hu et al., "FluidMeet: Enabling Frictionless Transitions Between In-Group, Between-Group, and Private Conversations During Virtual Breakout Meetings," CHI '22: Proceedings of the 2022 CHI Conference on Human Factors in Computing Systems, Article No. 511, Apr. 2022, pp. 1-17.
Anonymous, "Method for Creating Sub-Group Private Speech Channel in Virtual Meeting Rooms," An IP.com Prior Art Database Technical Disclosure, IPCOM000270861D, Sep. 2, 2022, 7 pages.
Prajapati et al., "Voice privacy using CycleGAN and time-scale modification," Computer Speech and Language, 74, 2022, 101353, pp. 1-30.
Zhou et al., "Computer-Based Privacy For Chat Group in a Virtual Environment," U.S. Appl. No. 18/486,543, filed Oct. 13, 2023.
List of IBM Patents or Patent Applications Treated as Related, Filed herewith, 2 pages.

* cited by examiner

COMPUTER-BASED PRIVACY PROTECTION FOR CHAT GROUPS IN A VIRTUAL ENVIRONMENT

BACKGROUND OF THE INVENTION

The present invention relates generally to data privacy, and more particularly to the field of improving the privacy within digital communication.

The term chat room, or chatroom (and sometimes chat group), is primarily used to describe any form of synchronous conferencing, occasionally even asynchronous conferencing. The term can thus mean any technology, ranging from real-time online chat and online interaction with strangers (e.g., online forums) to fully immersive graphical social environments. The primary use of a chat room is to share information via text with a group of other users. The ability to converse with multiple people in the same conversation differentiates chat rooms from instant messaging programs, which are more typically designed for one-to-one communication. The users in a particular chat room are generally connected via a shared internet or other similar connection, and chat rooms exist catering for a wide range of subjects. New technology has enabled the use of file sharing and webcams, and virtual interaction using three-dimensional avatars within a virtual world.

SUMMARY

Embodiments of the present invention disclose a computer-implemented method, computer system, and computer program product for improving digital privacy and communication, the computer-implemented method comprising: responsive to identifying a private chat group has been created between two or more users, collecting, by an internet of things (IoT) sensor set, a voice for each user in the private chat group; analyzing, by an analysis module, the collected voice, an intonation associated with the collected voice and an original pronunciation associated with the collected voice; generating a de-content pronunciation based on the analysis of the collected voice, the intonation, and the original pronunciation; outputting, by the IoT sensor set, the intonation and the original pronunciation to the two or more users in the private chat group; and outputting, by the IoT sensor set and a client computer, the intonation and the de-content pronunciation to one or more users outside the private chat group.

DETAILED DESCRIPTION

Embodiments of the present invention recognize that private chat groups in three-dimensional (3D) virtual rooms do not disclose private chat content to users outside the group. Typically, a floating text above a private chat group is used at most to inform external users of the current topic being discussed by the private chat group, which allows external users gauge their interest in joining the chat group. However, embodiments of the present invention recognize that using floating text to inform external users of the current topic does not create a good experience and is not a natural way of knowing the current discussion topic that does not mimic or mirror conversations in the physical world.

Moreover, embodiments of the present invention recognize that before users join private chat groups, due to the opacity of these groups, users are unable determine the overall engagement level of the group, i.e., whether there are many or few utterances taking place, the engagement level of each member within the group, i.e., how many utterances each member has made, and/or understand the progress of the current topic (i.e., how long the current topic will last). Therefore, embodiments of the present invention recognize that after applying and being approved to join a private group, users may find that the group does not talk about topics efficiently, or the current topic that they are interested has ended, which results an unsatisfactory experience for users. Further, embodiments of the present invention recognize that a user's voice may be considered sensitive and/or private data because a user's voice is unique and can be utilized to access or identify sensitive and/or protected data. Embodiments of the present invention recognize that, currently in the art, to protect the privacy in metaverse, one known solution is to only transfer the voice among limited people, which leaves others unable to hear the voice at all. This current solution makes a virtual world (e.g., the metaverse) a strange place because it leaves users to witness other users silently speaking with their mouths and bodies (e.g., body language).

Embodiments of the present invention improve the art of virtual communication and solve the issues stated above by presenting external perceivable features of a private chat group within a virtual world. More specifically, embodiments improve the art of virtual communication and solve the particular issues stated above by (i) inviting an attendee or a group of people to join a group in privacy mode; (ii) capturing the voice and analyzing it to get an intonation, an original pronunciation, and a de-content pronunciation; and (iii) broadcasting the intonation and original pronunciation to the attendee in the privacy mode and the intonation and de-content pronunciation to a person outside the privacy mode. Pronunciation may be the context of a voice (e.g., "it is a good day", "how are you", etc.) and may comprise both phrases, sentences, and any other form of context of speech by an identified voice.

Implementation of embodiments of the invention may take a variety of forms, and exemplary implementation details are discussed subsequently with reference to the Figures (i.e., FIG. 1A-FIG. 5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1A:
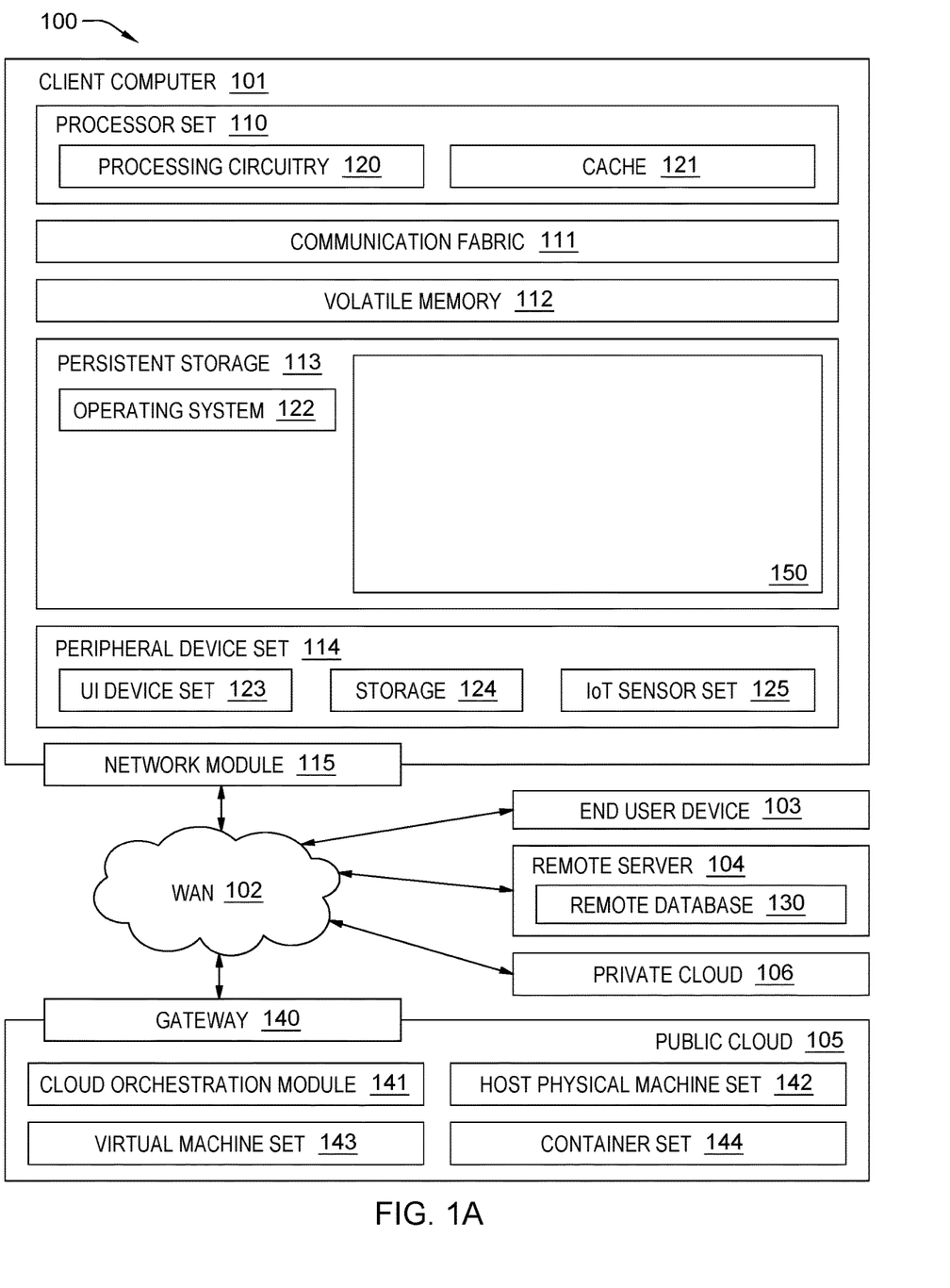
FIG. 1A is a functional block diagram illustrating a distributed data processing environment, a program, in accordance with an embodiment of the present invention.

Computing environment 100 contains an example of an environment for the execution of at least some of the computer code involved in performing the inventive methods, such as program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, a virtual reality headset, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may generate and output externally perceivable features (e.g., auditory, textual, and/or physical conversation) of a private chat group in a 3D virtual chat room. Physical conversation is to be construed as any form of sign language and body language. For example, suppose there is a user represented by a virtual avatar, who is not a member of a private chat group, standing in a virtual coffee shop next to a private chat group sitting at a table. In this example, responsive to component 150 identifying the user being within a predetermined distance of the private chat group, component 150 captures the voice of each member of the private chat group, analyzes the captured voice(s) to generate an intonation, an original pronunciation, and a de-content pronunciation for each voice, and broadcasts the intonation and original pronunciation to the users in the private chat group and the intonation and de-content pronunciation to user outside (i.e., not a member of) the private chat group. In various embodiments, component 150 manipulates the intonation associated with the original pronunciation to create a secondary intonation that is broadcast with the de-content pronunciation to the one or more users outside of the chat group. For example, manipulating the pitch, dynamic, timbre, and/or duration of the users captured voice associated with original pronunciation to remove and/or distort the content in the original pronunciation to create the de-content pronunciation.

In various embodiments, component 150 creates a private chat group by inviting users into a group with an active privacy mode. Responsive to two or more users joining the group and the privacy mode being activated, component 150 may capture the voices of each member of the private chat group, analyzes the captured voice(s) to generate an intonation, an original pronunciation, and a de-content pronunciation for each voice. In various embodiments, component 150 outputs the intonation and original pronunciation to the users in the private chat group and the intonation and de-content pronunciation to user outside (i.e., not a member of) the private chat group. In various embodiments, the intonation, original pronunciation, and de-content pronunciation are recorded and labeled as different data (e.g., data1, data2, data3, etc.) correspondingly for each user in the chat group.

In various embodiments, component 150 monitors a predetermined area in a virtual world, identifies that the two or more users are engaging in a conversation, generates and outputs a responsive prompt to each participant in a conversation to enter the private chat group, and responsive to the two or more users accepting to enter the private chat group, creates the private chat group. In various embodiments, responsive to identifying a private chat group has been created between two or more users, component 150 collects a voice for each user in the private chat group, analyzes the collected voice, an intonation associated with the collected voice and an original pronunciation associated with the collected voice, and generates a de-content pronunciation based on the analysis of the collected voice, the intonation, and the original pronunciation. Component 150 may output the intonation and the original pronunciation to the two or more users in the private chat group and output the intonation and the de-content pronunciation to one or more users outside the private chat group. In various embodiments, responsive to receiving accessibility settings, component 150 outputs non-sensical text and/or random images as the de-content pronunciation, monitors, and tracks, in real time, at least a portion of a conversation being held within the chat group and identifies and extracts an intonation associated with each voice spoken in the chat group. Component 150 may utilize the intonation to manipulate the original pronunciation and produce the de-content pronunciation, wherein the de-content pronunciation comprises nonsensical audible sounds, and wherein manipulation comprises: replaces at least a portion of content in the original pronunciation with predetermined or random pronunciations.

Figure 1B:
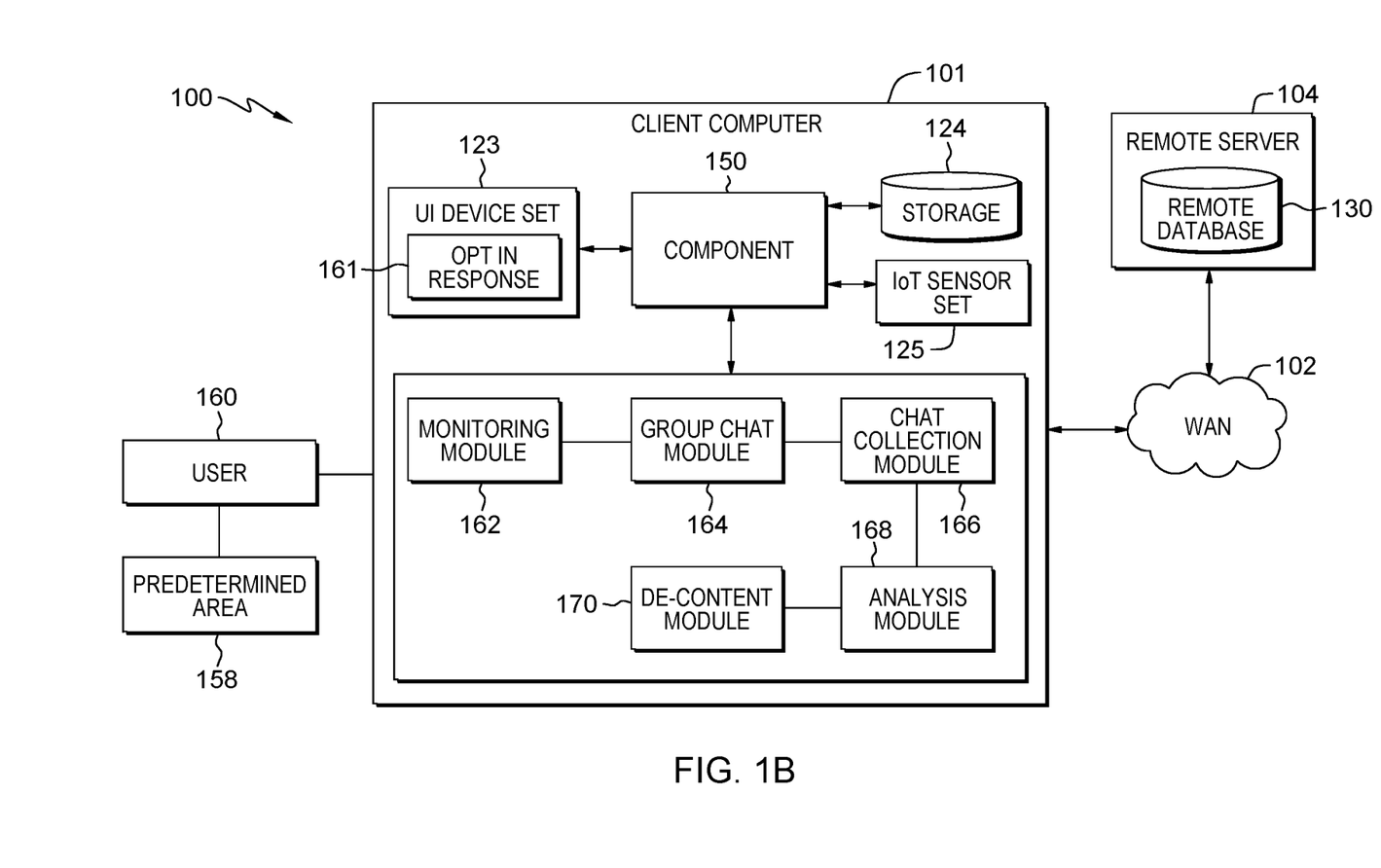
FIG. 1B is a functional block diagram illustrating a distributed data processing environment, a program, in accordance with an embodiment of the present invention.

FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 158, user 160, client computer 101, and remote server 104 interconnected via WAN 102.

In the depicted embodiment, via UI device set 123, component 150 issues and/or receives permission from a user/operator of IoT sensor set 125 to track and/or monitor user 160 and predetermined area 158 (i.e., receive opt-in response 161), wherein predetermined area 158 is a predetermine area surrounding user 160 in a real and/or virtual world area.

Component 150 may utilize IoT sensor set 125 to identify and monitor user 160 while user 160 is interacting in a virtual world. For example, component 150 identifies, via cameras, stereoscopic display, stereo sound, microphones, accelerometers, gyroscopes, and/or any other sensors known and used in the art. In various embodiments, component 150, via monitoring module 162, utilizes IoT sensor set 125 to monitor the actions and/or interactions of user 160 in predetermined area 158 of a virtual world. For example, monitoring module 162 identifies user 160 is engaging in a conversation with a second user based on the utilization of the microphone within IoT sensor set 125 or a chat window that can be hosted on UI device set 123. In various embodiments, component 150 may ingest omnidirectional input data from IoT sensor set 125 to observe and identify objects and other users in predetermined area 158.

In the depicted embodiment, responsive to identifying user 160 is engaging in a conversation with one or more second users in the virtual world, component 150, via group chat module 164, creates a private chat group for user 160 and the one or more second users. Component 150 may create a private chat group by inviting users who are participating in a conversation with user 160 within predetermined area 158. In various embodiments, component 150 monitors predetermined area 158 in a virtual world, wherein responsive to component 150 identifying that two or more users are engaging in a conversation, component 150 outputs, via UI device set 123, a responsive prompt to each participant in the conversation to join/enter into a private chat group. Component 150 may create a private chat group by inviting users into a group with an active privacy mode. Responsive to one or more users joining the private chat group with user 160 and a privacy mode being activated, component 150, via chat collection module 166, may capture the voices of each member of the private chat group.

In the depicted embodiment, component 150 analyzes, via analysis module 168, the captured voices, from the private chat group, to generate an intonation, an original pronunciation, and a de-content pronunciation for each voice. In various embodiments, component 150 analyzes, via analysis module 168, the collected voices of the users in the private chat group to obtain and/or generate an intonation of the user's voice, an original pronunciation, and a de-content pronunciation. In various embodiments, component 150, via analysis module 168, parses the collected voice(s) to identify and obtain an intonation and an original pronunciation from the voices of the users in the private chat group and to generate a de-content pronunciation from the original pronunciation. Component 150, via analysis module 168, may identify and separate the intonation and original pronunciation from a captured voice based on the parsing, wherein component 150 may create a separate file for each of the intonation and original pronunciation associated with a captured voice.

Component 150, via de-content module 170, creates the de-content pronunciation by removing identified words and terms from the original pronunciation and/or by manipulating the intonation to create nonsensical sounds, wherein the nonsensical sounds are output, via IoT sensor set 125 and/or client computer 101, as a de-content pronunciation to users outside of the private chat group. In various embodiments, the intonation with "original pronunciation" or "de-content pronunciation" can be combined to generate a voice message that is output, via IoT sensor set 125 and/or client computer 101, to users outside of the private chat group. In the depicted embodiment, component 150 outputs, via IoT sensor set 125 and/or client computer 101, the original pronunciation only to members in the private chat group.

In various embodiments, component 150 outputs, via IoT sensor set 125 and/or client computer 101, the captured intonation and the captured original pronunciation associated with the users in the private chat group and outputs, via IoT sensor set 125 and/or client computer 101, the intonation and the de-content pronunciation to users outside the private chat group. In various embodiments, responsive to receiving accessibility settings, component 150 outputs, via IoT sensor set 125 and/or client computer 101, non-sensical text and/or random images as the de-content pronunciation. Component 150, via group chat module 164 monitors, and tracks, in real time, at least a portion of a conversation being held within the chat group, wherein component 150, via chat collection module 166 and analysis module 168, identifies and extracts an intonation associated with each voice spoken in the chat group. Component 150, via de-content module 170, may utilize the intonation to manipulate the original pronunciation and produce the de-content pronunciation, wherein the de-content pronunciation comprises nonsensical audible sounds, and wherein manipulation comprises: replaces at least a portion of content in the original pronunciation with predetermined or random pronunciations.

Figure 2:
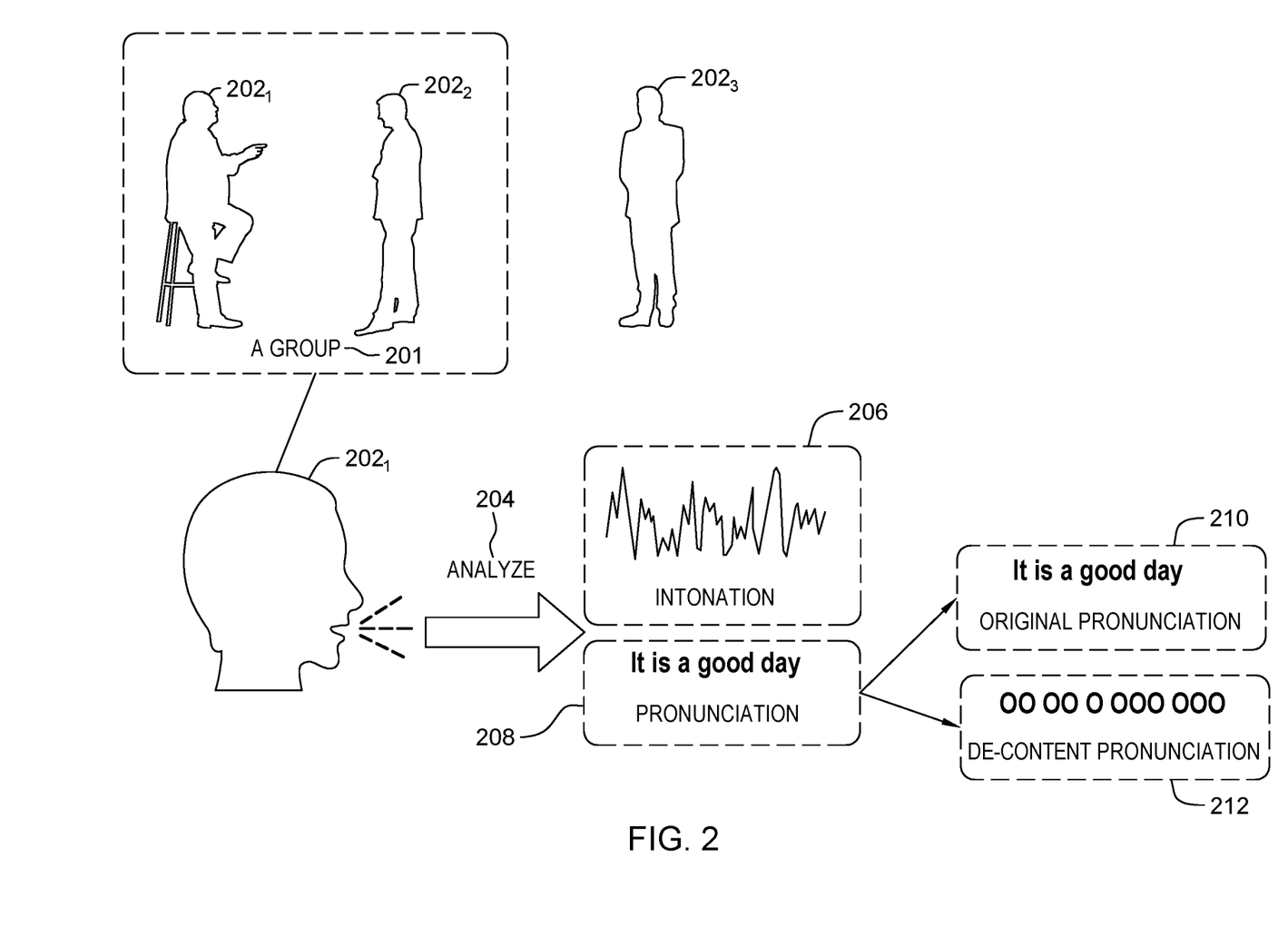
FIG. 2 illustrates a functional block diagram and operational steps of the program, on a server computer within the distributed data processing environment of FIGS. 1, in accordance with an embodiment of the present invention.

FIG. 2 is a functional block diagram illustrating a distributed data processing environment in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. The distributed data processing environment may include client computer 101, and remote server 104 interconnected via WAN 102.

In various embodiments, component 150 monitors and tracks, in real time, conversation (may also be referred to as real conversation) of users in a virtual environment. In various embodiments, during a conversation between two or more users in a virtual environment, component 150 can create a chat group by inviting the two or more users to join a chat group. In the depicted embodiment, user $202_1$ invites user $202_2$ to form chat group 201 to keep the conversation private from user $202_3$. In various embodiments, chat group 201 is a private chat group. In other embodiments, chat group 201 is a chat group with the ability to turn into a private chat group based on user selected settings. For example, two users, represented by avatars in a virtual environment, are seated on a bench in park, in which one user can invite the other user to join a private chat group (i.e., chat group 201) to maintain privacy in a public virtual space. In various embodiments, chat group 201 comprises user $202_1$-$202_N$, wherein N is any positive integer.

In various embodiments, component 150 captures, analyzes, and identifies the voices used when speaking in chat group 201 by the users within chat group 201. In the depicted embodiment, component 150 captures, analyzes 204, and handles (e.g., identifies, isolates, manipulates, and/or retrieves) the voice of user $202_1$ to generate and/or obtain intonation 206, original pronunciation 210, and de-content pronunciation 212. The intonation may be obtained and/or generated through known techniques in the art (e.g., modeling of intonation contours). In various embodiments, component 150 converts the captured and identified original pronunciation into text to create a text mode via natural language processing. Component 150 may utilize the text in the text mode to modify the text to create the de-content pronunciation and utilize the captured intonation to broadcast the de-content pronunciation. For example, modifying "it is a good day" to "o o o ooo oo." In various embodiments, responsive to obtaining the intonation and pronunciation in text mode, outputting a first communication to the users in the chat group and a second communication to users outside of the chat group, wherein the first communication is the original pronunciation, and the second communication is the de-content communication. In some embodiments, the second communication may a combination of the first and second communication. A communication may be any form of communication known in the art (e.g., audible, visual, etc.).

In the depicted embodiment, component 150 analyzes the captured voice associated with user $202_1$ to obtain intonation 206 and pronunciation 208. Component 150 may manipulate intonation 206 and pronunciation 208 to generate and output de-content pronunciation 212. De-content pronunciation 212 is original pronunciation 210 with at least a portion of the content in the pronunciation is replaced with predetermined or random pronunciations. In various embodiments, the content modification to the pronunciation resulting in de-content pronunciation 212 is meaningless (e.g., random sounds). For example, if original pronunciation 210 spoken by user $202_1$ is "it is a good day" then de-content pronunciation 212 is "OO OO O OOO." In various embodiments, component 150, utilizing intonation 206, manipulates original pronunciation 210 to produce de-content pronunciation 212.

In various embodiments, a user may be an automated chatbot, a user in the traditional sense, and/or any other type of user known and understood in the art. In various embodiments, responsive to received accessibility settings, output non-sensical text and/or random images as de-content pronunciation 212.

Figure 3:
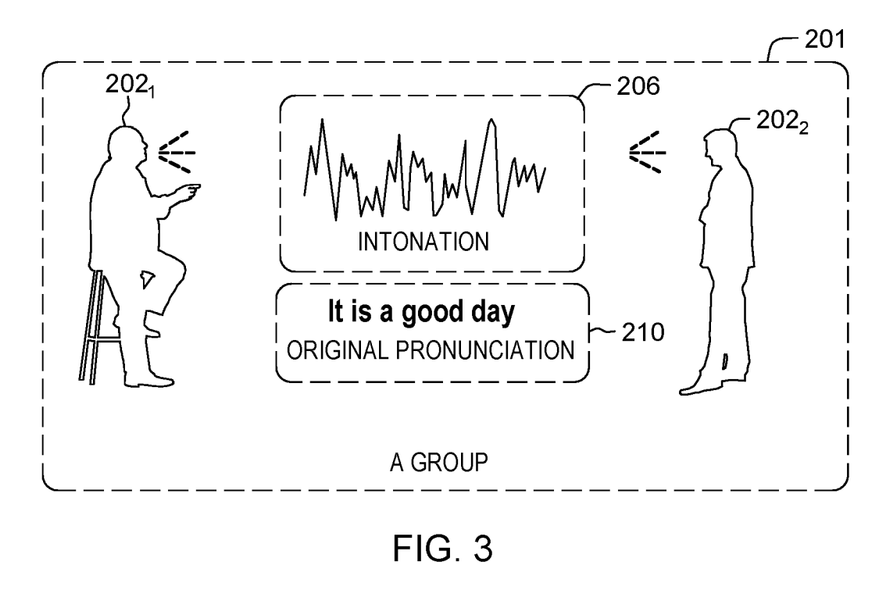
FIG. 3 illustrates a functional block diagram and operational steps of the program, on a server computer within the distributed data processing environment of FIGS. 1, in accordance with an embodiment of the present invention.

FIG. 3 is a functional block diagram illustrating a distributed data processing environment in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. The distributed data processing environment may include client computer 101, and remote server 104 interconnected via WAN 102.

In various embodiments, users in chat group 201 hear intonation 206 and original pronunciation 210. In the depicted embodiment, continuing the embodiment in FIG. 2, user $202_1$ and user $202_2$ are in chat group 201, wherein user $202_1$ is conversing with user $202_2$. In the depicted embodiment, user $202_2$ hears user $202_1$ say "it is a good day."

Figure 4:
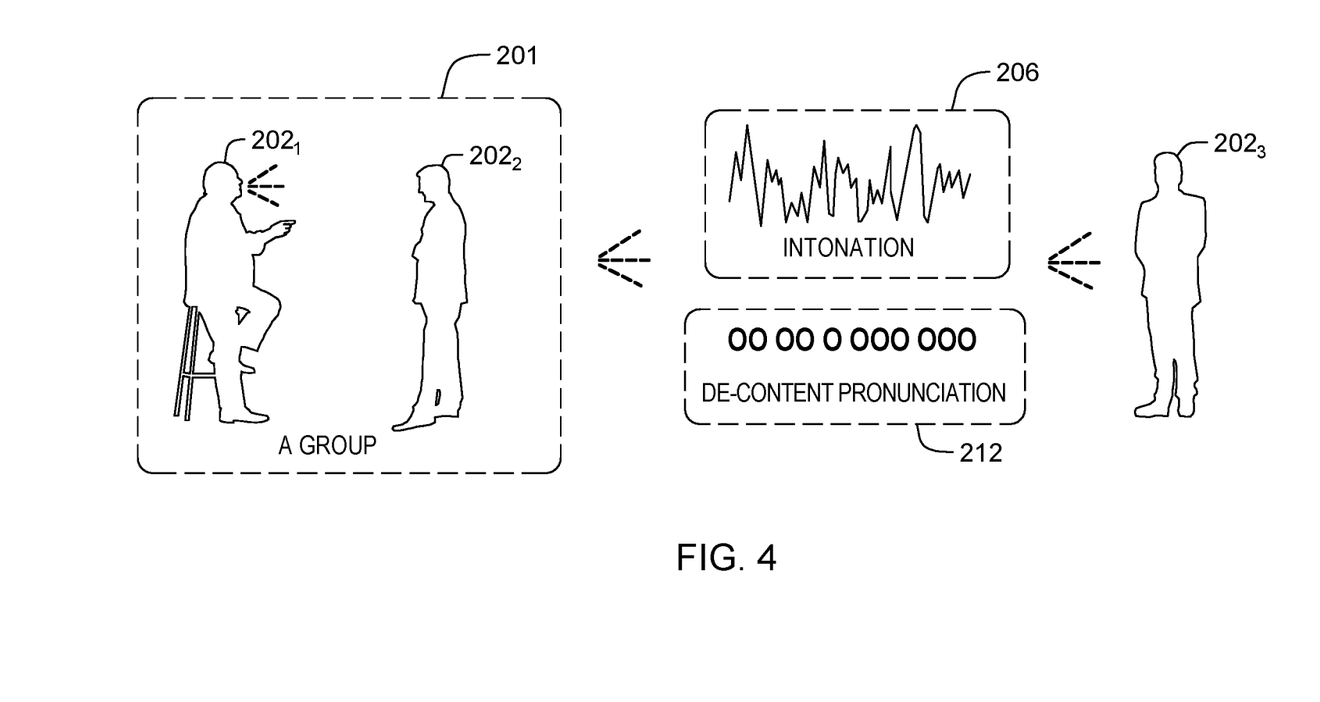
FIG. 4 illustrates a functional block diagram and operational steps of the program, on a server computer within the distributed data processing environment of FIGS. 1, in accordance with an embodiment of the present invention.

FIG. 4 is a functional block diagram illustrating a distributed data processing environment in accordance with one embodiment of the present invention. The term "distributed" as used in this specification describes a computer system that includes multiple, physically distinct devices that operate together as a single computer system. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. The distributed data processing environment may include client computer 101, and remote server 104 interconnected via WAN 102.

In various embodiments, outputs intonation 206 and de-content pronunciation 212 to the users outside of group 201 (e.g., user $202_3$). In the depicted embodiment, continuing the embodiment in FIG. 2 and FIG. 3 above, user $202_1$ and user $202_2$ are in chat group 201, wherein component 150 outputs intonation 206 and de-content pronunciation 212 to user $202_3$ so that only intonation 206 and de-content pronunciation 212 are heard by user $202_3$. In various embodiments, the content produced (e.g., said) by users in chat group 201 is kept private while an audible noise is output to users outside of chat group 201. For example, user $202_3$ will hear "OO OO O OOO" instead of "it is a good day." In various embodiments, component 150 manipulates intonation 206, removes the content from any spoken and/or communicated language during a conversation, utilizes intonation 206 to replace the content with an audible sound to produce and output de-content pronunciation 212. In various embodiments, component 150 repeats this process for each user in chat group 201 and every time a user in chat group 201 speaks. In some embodiments, component 150 continually executes the actions above until the privacy feature is disabled.

Figure 5:
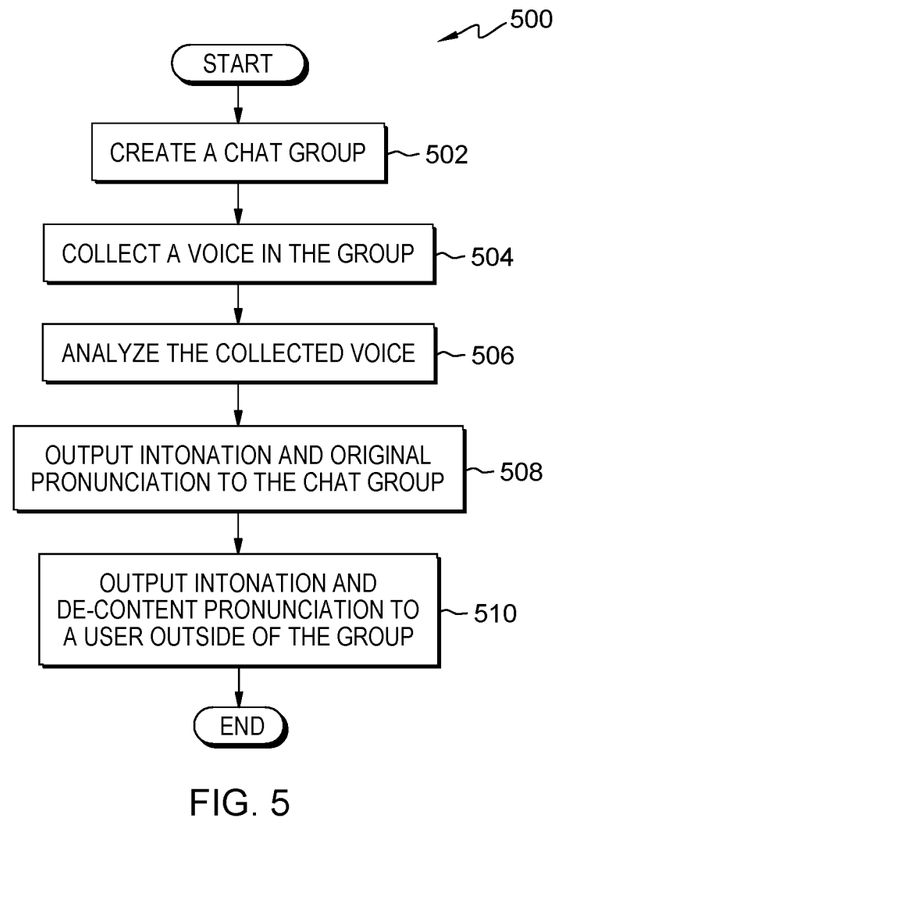
FIG. 5 illustrates operational steps of the program, on a server computer within the distributed data processing environment of FIGS. 1, for enhancing privacy protection of a chat group in a virtual environment, in accordance with an embodiment of the present invention.

FIG. 5 illustrates operational steps of component 150, generally designated 500, in communication with client computer 101, remote server 104, private cloud 106, EUD 103, and/or public cloud 105, within distributed data processing environment 100, for enhancing privacy protection of a chat group in a virtual environment, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502, component 150 creates a group. In various embodiments, component 150 creates a private chat group by inviting users participating in a conversation. In various embodiments, component 150 monitors a predetermined area in a virtual world, wherein if component 150 identifies that two or more users are engaging in a conversation, then component 150 outputs a responsive prompt to each participant in the conversation to join/enter into a private chat group.

In step 504, component 150 collects a voice from the group. In various embodiments, component 150 collects the voice of each user in the private chat group in real-time while users are conversing in the private chat group.

In step 506, component 150 analyzes the collected voice. In various embodiments, component 150 analyzes the collected voices of the users in the private chat group to obtain and/or generate an intonation of the user's voice, an original pronunciation, and a de-content pronunciation. In various embodiments, component 150 parses the collected voice to identify and obtain an intonation of the users voice, an original pronunciation and to generate a de-content pronunciation from the original pronunciation. Component 150 creates the de-content pronunciation by removing identified words and terms from the original pronunciation and/or by manipulating the intonation to create nonsensical sounds, wherein the nonsensical sounds are output as the de-content pronunciation. In various embodiments, the intonation with "original pronunciation" or "de-content pronunciation" can be combined to generate a voice message.

In step 508, component 150 outputs an intonation and original pronunciation to the chat group. In various embodiments, component 150 outputs an intonation and original pronunciation, associated with the collected voice, to the chat group.

In step 510, component 150 outputs the intonation and de-content pronunciation to a user outside of the chat group. In various embodiments, component 150 outputs an intonation and the de-content pronunciation to user(s) that are not a member of the private chat group.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to identifying a private chat group has been created between two or more users, collecting, by an internet of things (IoT) sensor set, a voice for each user in the private chat group;
   analyzing, by an analysis module, the collected voice, an intonation associated with the collected voice and an original pronunciation associated with the collected voice;
   generating a de-content pronunciation based on the analysis of the collected voice, the intonation, and the original pronunciation;
   outputting, by the IoT sensor set, the intonation and the original pronunciation to the two or more users in the private chat group; and
   outputting, by the IoT sensor set and a client computer, the intonation and the de-content pronunciation to one or more users outside the private chat group.

2. The computer-implemented method of claim 1, further comprising:
   responsive to receiving accessibility settings, outputting non-sensical text and/or random images as the de-content pronunciation.

3. The computer-implemented method of claim 1, further comprising:
   monitoring and tracking, in real time, at least a portion of a conversation being held within the chat group; and
   identifying and extracting an intonation associated with each voice spoken in the chat group.

4. The computer-implemented method of claim 1, further comprising:
   utilizing the intonation to manipulate the original pronunciation and produce the de-content pronunciation, wherein manipulation comprises:
      replacing at least a portion of content in the original pronunciation with predetermined or random pronunciations.

5. The computer-implemented method of claim 4, wherein the de-content pronunciation comprises nonsensical audible sounds.

6. The computer-implemented method of claim 1, further comprising:
   monitoring a predetermined area in a virtual world; and
   identifying that the two or more users are engaging in a conversation.

7. The computer-implemented method of claim 1, further comprising:
   generating and outputting a responsive prompt to each participant in a conversation to enter the private chat group; and
   responsive to the two or more users accepting to enter the private chat group, creating the private chat group.

8. A computer system comprising:
   one or more computer processors;
   one or more computer readable storage devices;
   program instructions stored on the one or more computer readable storage devices for execution by at least one of the one or more computer processors, the stored program instructions comprising:
      responsive to identifying a private chat group has been created between two or more users, program instructions to collect, by an internet of things (IoT) sensor set, a voice for each user in the private chat group;
      program instructions to analyze, by an analysis module, the collected voice, an intonation associated with the collected voice and an original pronunciation associated with the collected voice;
      program instructions to generate a de-content pronunciation based on the analysis of the collected voice, the intonation, and the original pronunciation;
      program instructions to output, by the IoT sensor set, the intonation and the original pronunciation to the two or more users in the private chat group; and
      program instructions to output, by the IoT sensor set and a client computer, the intonation and the de-content pronunciation to one or more users outside the private chat group.

9. The computer system of claim 8, further comprising:
   responsive to receiving accessibility settings, program instructions to output non-sensical text and/or random images as the de-content pronunciation.

10. The computer system of claim 8, further comprising:
    program instructions to monitor and track, in real time, at least a portion of a conversation being held within the chat group; and
    program instructions to identify and extract an intonation associated with each voice spoken in the chat group.

11. The computer system of claim 8, further comprising:
    program instructions to utilize the intonation to manipulate the original pronunciation and produce the de-content pronunciation, wherein manipulation comprises:
       program instructions to replace at least a portion of content in the original pronunciation with predetermined or random pronunciations.

12. The computer system of claim 11, wherein the de-content pronunciation comprises nonsensical audible sounds.

13. The computer system of claim 8, further comprising:
    program instructions to monitor a predetermined area in a virtual world; and
    program instructions to identify that the two or more users are engaging in a conversation.

14. The computer system of claim 8, further comprising:
    program instructions to generate and output a responsive prompt to each participant in a conversation to enter the private chat group; and
    responsive to the two or more users accepting to enter the private chat group, program instructions to create the private chat group.

15. A computer program product comprising:
    one or more computer readable storage devices and program instructions stored on the one or more computer readable storage devices, the stored program instructions comprising:
       responsive to identifying a private chat group has been created between two or more users, program instructions to collect, by an internet of things (IoT) sensor set, a voice for each user in the private chat group;
       program instructions to analyze, by an analysis module, the collected voice, an intonation associated with the collected voice and an original pronunciation associated with the collected voice;
       program instructions to generate a de-content pronunciation based on the analysis of the collected voice, the intonation, and the original pronunciation;
       program instructions to output, by the IoT sensor set, the intonation and the original pronunciation to the two or more users in the private chat group; and program instructions to output, by the IoT sensor set and a client computer, the intonation and the de-content pronunciation to one or more users outside the private chat group.

16. The computer program product of claim 15, further comprising:
responsive to receiving accessibility settings, program instructions to output non-sensical text and/or random images as the de-content pronunciation.

17. The computer program product of claim 15, further comprising:
program instructions to monitor and track, in real time, at least a portion of a conversation being held within the chat group; and
program instructions to identify and extract an intonation associated with each voice spoken in the chat group.

18. The computer program product of claim 15, further comprising:
program instructions to utilize the intonation to manipulate the original pronunciation and produce the de-content pronunciation, wherein the de-content pronunciation comprises nonsensical audible sounds, and wherein manipulation comprises:
program instructions to replace at least a portion of content in the original pronunciation with predetermined or random pronunciations.

19. The computer program product of claim 15, further comprising:
program instructions to monitor a predetermined area in a virtual world; and
program instructions to identify that the two or more users are engaging in a conversation.

20. The computer program product of claim 15, further comprising:
program instructions to generate and output a responsive prompt to each participant in a conversation to enter the private chat group; and
responsive to the two or more users accepting to enter the private chat group, program instructions to create the private chat group.

* * * * *